(12) United States Patent
Pascazio et al.

(10) Patent No.: US 10,053,365 B2
(45) Date of Patent: Aug. 21, 2018

(54) GRAPHITIZATION FURNACE, SYSTEM, AND GRAPHITIZATION METHOD

(71) Applicants: SHOWA DENKO CARBON INC., Ridgeville, SC (US); SHOWA DENKO K.K., Tokyo (JP)

(72) Inventors: Daniel Pascazio, Ridgeville, SC (US); Steve Shary, Ridgeville, SC (US); Earl Schultz, Ridgeville, SC (US); David Whichard, Ridgeville, SC (US); Bill Milfelt, Ridgeville, SC (US); Mutsushi Wada, Ridgeville, SC (US); Satoshi Hamada, Tokyo (JP); Yasuhiro Arai, Tokyo (JP)

(73) Assignees: SHOWA DENKO CARBON INC., Ridgeville, SC (US); SHOWA DENKO K.K., Tokyo (JP)

( * ) Notice: Subject to any disclaimer, the term of this patent is extended or adjusted under 35 U.S.C. 154(b) by 212 days.

(21) Appl. No.: 14/686,854

(22) Filed: Apr. 15, 2015

(65) Prior Publication Data

US 2016/0304349 A1   Oct. 20, 2016

(51) Int. Cl.
| | | |
|---|---|---|
| C01B 31/04 | (2006.01) |
| F27D 11/06 | (2006.01) |
| F27D 11/04 | (2006.01) |
| F27B 5/04 | (2006.01) |
| F27B 5/14 | (2006.01) |
| F27B 5/18 | (2006.01) |
| C01B 32/20 | (2017.01) |
| F27D 9/00 | (2006.01) |

(52) U.S. Cl.
CPC .............. *C01B 31/04* (2013.01); *C01B 32/20* (2017.08); *F27B 5/04* (2013.01); *F27B 5/14* (2013.01); *F27B 5/18* (2013.01); *F27D 11/04* (2013.01); *F27D 2009/007* (2013.01)

(58) Field of Classification Search
CPC ......... C01B 31/04; C01B 32/20; F27D 11/04; F27D 11/06; F27D 2009/007; F27D 5/0062; F27B 5/04; F27B 5/14; F27B 5/18
USPC ............................... 373/29, 88, 92, 133, 150
See application file for complete search history.

(56) References Cited

U.S. PATENT DOCUMENTS

| | | | | | |
|---|---|---|---|---|---|
| 1,029,121 | A | * | 6/1912 | Heroult | H05B 3/62 373/114 |
| 4,015,068 | A | * | 3/1977 | Vohler | C04B 35/52 373/110 |
| 4,394,766 | A | * | 7/1983 | Karagoz | C04B 35/52 373/115 |
| 5,117,439 | A | * | 5/1992 | Dagata | C04B 35/52 264/449 |
| 5,631,919 | A | * | 5/1997 | Intermill | C04B 35/52 373/120 |

(Continued)

*Primary Examiner* — Tu B Hoang
*Assistant Examiner* — Vy Nguyen
(74) *Attorney, Agent, or Firm* — IPUSA, PLLC

(57) ABSTRACT

A graphitization furnace has a furnace structure including a support part within a furnace chamber, and a gate valve. The gate valve in an open state thereof after a graphitization process dumps a pack material within the furnace chamber in a state in which carbon bodies are located within the furnace chamber, and the support part catches the carbon bodies as a level of the carbon bodies lowers with a decrease in an amount of the pack material remaining within the furnace chamber.

22 Claims, 5 Drawing Sheets

(56) References Cited

U.S. PATENT DOCUMENTS

| | | | |
|---|---|---|---|
| 6,834,072 B2 * | 12/2004 | Daimer | C04B 35/521 |
| | | | 373/110 |
| 2003/0020214 A1 * | 1/2003 | Poor | C23C 8/22 |
| | | | 266/252 |
| 2010/0208765 A1 * | 8/2010 | Carlson | C21C 5/5211 |
| | | | 373/9 |

* cited by examiner

GRAPHITIZATION FURNACE, SYSTEM, AND GRAPHITIZATION METHOD

BACKGROUND OF THE INVENTION

1. Field of the Invention

The present invention relates to a graphitization furnace for graphitization of carbon bodies, a system that includes a plurality of such graphitization furnaces, and a graphitization method.

2. Description of the Related Art

Furnaces conventionally used for graphitization of carbon bodies include an LWG (Length-Wise Graphitization) furnace or the like. The LWG furnace may be used to produce graphitized electrode bodies that are typically cylindrical in shape.

The LWG furnace is provided with a hood that covers a furnace chamber. The hood is opened when loading the carbon bodies inside the furnace chamber and supplying a pack material such as coke into the furnace chamber prior to heating to a graphitization temperature, and is closed during a graphitization process. The carbon bodies are buried in the pack material for heat insulation and anti-oxidation. The hood is also opened when collecting the pack material and unloading the graphitized electrode bodies from the furnace chamber after the graphitization process and a lapse of a sufficient cooling time. The loading of the carbon bodies and the unloading of the graphitized electrode bodies into and from the furnace chamber, respectively, are performed by a loading and unloading mechanism. Further, the supplying and collecting of the pack material into and from the furnace chamber, respectively, are performed by a supplying and collecting mechanism. After the pack material is collected and the graphitized electrode bodies are unloaded from the furnace chamber, the LWG furnace is reused for a next graphitization process.

Accordingly, the unloading of the graphitized electrode bodies from the furnace chamber depends on the cooling time, an efficiency of the supplying and collecting mechanism that collects and removes the pack material from the furnace chamber after the graphitization process in order to enable unloading of the graphitized electrode bodies, and an efficiency of the loading and unloading mechanism that unloads the graphitized electrode bodies from the furnace chamber. Because it is difficult to reduce the cooling time in the case of self-cooling, and a cycle with which the LWG furnace is reused depends on the cooling time and an operation time of the supplying and collecting mechanism particularly during collection of the pack material, a high-productivity system is difficult to design.

On the other hand, an apparatus for the production of graphite from carbon bodies, having a refractory lined open-topped metal and generally U-shaped shell furnace, is proposed in U.S. Pat. No. 4,394,766, for example. The proposed apparatus is provided with a means to remove a thermal insulation medium by gravity dumping through a bottom of the furnace. However, electrodes are removed from the furnace by a stock extractor after a predetermined cooling period, and the thermal insulation medium is thereafter dumped into hoppers.

For this reason, according to this proposed apparatus, a considerably long cooling time would be required if the electrodes were to be removed from the furnace after the electrodes have cooled down to a low temperature. Otherwise, the electrodes would have to be removed from the furnace when the electrodes are still at a high temperature. On the other hand, if the thermal insulation medium were dumped from the furnace before removing the electrodes, the electrodes would fall to the bottom of the furnace. In this case, the electrodes at the bottom of the furnace may interfere with the dumping of the thermal insulation medium from the furnace. In addition, it may become difficult for the stock extractor to remove the electrodes at the bottom of the furnace.

Consequently, it is conventionally difficult to design a high-productivity system for the graphitization of the carbon bodies.

SUMMARY OF THE INVENTION

Embodiments of the present invention provide a graphitization furnace and a system that enable design of a high-productivity system.

According to one aspect of the embodiment, a graphitization furnace includes a furnace structure including a support part and a pair of terminal electrodes; a hood having an open state and a closed state and provided at an upper part of the furnace structure; and a gate valve having an open state and a closed state and provided at a lower part of the furnace structure, wherein the furnace structure forms an enclosed furnace chamber together with the hood in the closed state thereof and the gate valve in the closed state thereof during an LWG (Length-Wise Graphitization) process which graphitizes an electrically conductive column buried in a pack material at a level above the support part and the pair of terminal electrodes electrically connect to opposite ends of the electrically conductive column, wherein the electrically conductive column includes a plurality of carbon bodies placed in end-to-end contact, wherein the gate valve in the open state thereof after the LWG process dumps the pack material within the furnace chamber in a state in which the plurality of carbon bodies are located within the furnace chamber, and the support part catches the plurality of carbon bodies as the level of the plurality of carbon bodies lowers with a decrease in an amount of the pack material remaining within the furnace chamber.

According to another aspect of the embodiment, a system a includes a plurality of graphitization furnaces each including a furnace structure including a support part and a pair of terminal electrodes; a hood having an open state and a closed state and provided at an upper part of the furnace structure lower part of the furnace structure, wherein the furnace structure forms an enclosed furnace chamber together with the hood in the closed state thereof and the gate valve in the closed state thereof during an LWG (Length-Wise Graphitization) process which graphitizes an electrically conductive column buried in a pack material at a level above the support part and the pair of terminal electrodes electrically connect to opposite ends of the electrically conductive column, wherein the electrically conductive column includes a plurality of carbon bodies placed in end-to-end contact, herein the gate valve in the open state thereof after the LWG process dumps the pack material within the furnace chamber in a state in which the plurality of carbon bodies are located within the furnace chamber, and the support part catches the plurality of carbon bodies as the level of the plurality of carbon bodies lowers with a decrease in an amount of the pack material remaining within the furnace chamber.

According to still another aspect of the present invention, a graphitization method includes performing an LWG (Length-Wise Graphitization) process in a graphitization furnace which graphitizes an electrically conductive column, buried in a pack material at a level above a support part within a furnace chamber, and having opposite ends electrically connected to a pair of terminal electrodes, wherein the electrically conductive column includes a plurality of carbon bodies placed in end-to-end contact; and dumping the pack material within the furnace chamber by opening a gate valve of the graphitization furnace after the LWG process in a state in which the plurality of carbon bodies are located within the furnace chamber, so that the support part catches the plurality of carbon bodies as the level of the plurality of carbon bodies lowers with a decrease in an amount of the pack material remaining within the furnace chamber.

Other objects and further features of the present invention will be apparent from the following detailed description when read in conjunction with the accompanying drawings.

DESCRIPTION OF THE PREFERRED EMBODIMENTS

Figure 1:
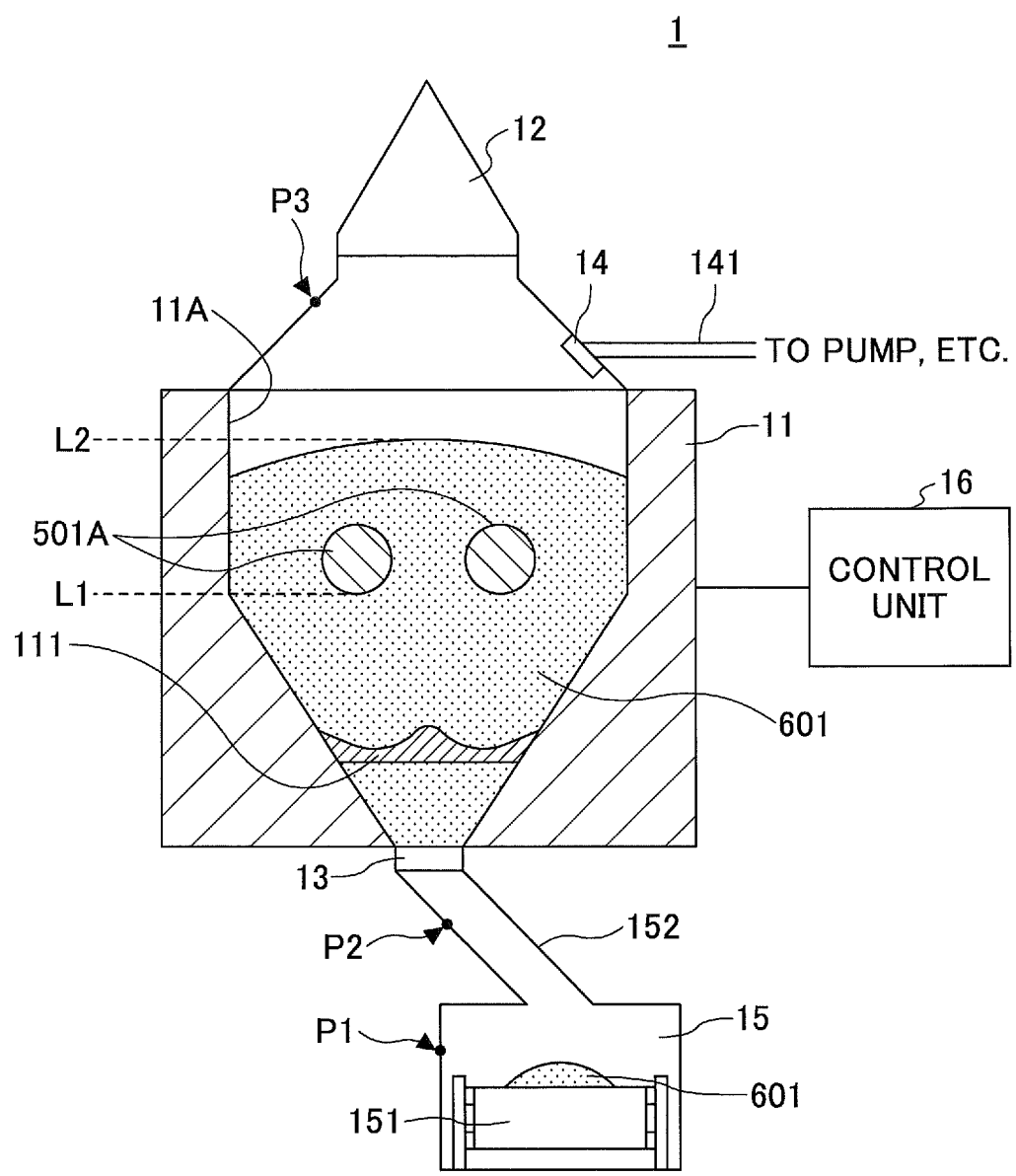
FIG. 1 is a diagram schematically illustrating an example of a graphitization furnace in a first embodiment of the present invention.

A description will be given of a graphitization furnace, a system, and a graphitization method in each embodiment of the present invention, by referring to the drawings. The present invention is not limited to the described embodiments, and various variations, modification, and substitutions may be made without departing from the scope of the present invention.

Figure 2:
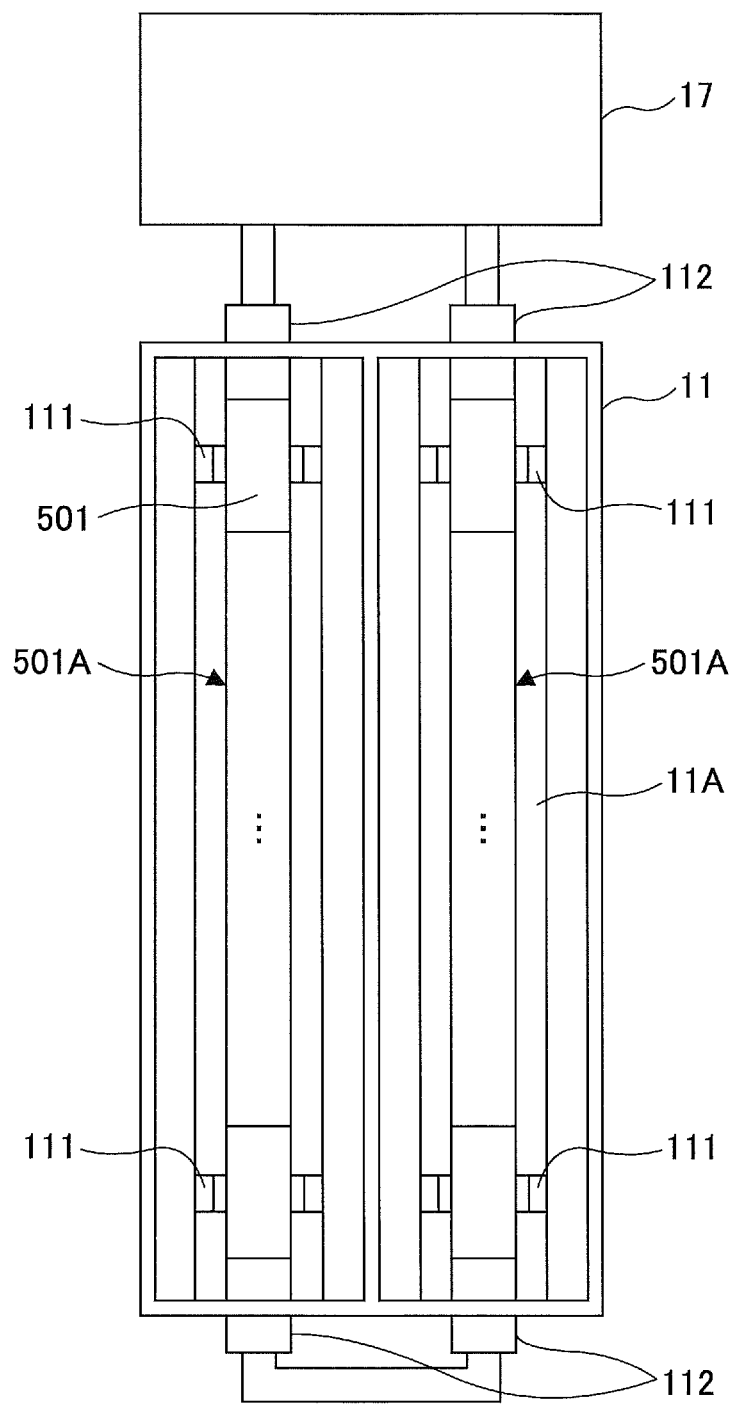
FIG. 2 is a plan view schematically illustrating the graphitization furnace illustrated in FIG. 1 with a hood omitted.

A description will be given of an example of a graphitization furnace in a first embodiment of the present invention, by referring to FIGS. 1 and 2. FIG. 1 is a diagram schematically illustrating this example of the graphitization furnace in the first embodiment of the present invention. FIG. 2 is a plan view schematically illustrating the graphitization furnace illustrated in FIG. 1 with a hood omitted.

A graphitization furnace 1 illustrated in FIG. 1 includes a furnace structure 11, a support part 111 provided within the furnace structure 11, hood 12, a gate valve 13, a release valve 14, a recovery mechanism 15, and a control unit 16. FIG. 1 illustrates a state in which a plurality of carbon bodies 501, placed in end-to-end contact to form an electrically conductive column 501A, are buried in a pack material 601 that fills the furnace structure 11, up to a first level L1 above the support part 111.

The furnace structure 11 is made of a refractory material, such as alumina castable, fused silica castable, and high alumina brick, or the like, for example. The furnace structure 11 may be provided on a steel frame structure (not illustrated), such as a steel H-beam structure, for example. The hood 12 may be made of steel, for example. In addition, the gate valve 13 may be made of a combination of a refractory material and steel, for example, such that at least a part of the gate valve 13 that makes contact with the pack material 601 is made of the refractory material.

The hood 12 has an open state and a closed state, and is provided at any suitable upper part of the furnace structure 11. A configuration that permits the hood 12 to open and close is not limited to a particular configuration. As an example, an actuator (not illustrated) or the like may be used to open and close the hood 12 which may or may not be connected to the furnace structure 11 via a hinge (not illustrated). The gate valve 13 has an open state and a closed state, and is provided at any suitable lower part of the furnace structure 11.

In FIG. 1, the gate valve 13 is provided at a lowermost part (that is, at a bottom) of the furnace chamber 11A, however, the gate valve 13 may be provided at other lower parts of the furnace structure 11, including a sloping inner wall portion at a constricted lower part of the furnace structure 11. A configuration that permits the gate valve 13 to open and close is not limited to a particular configuration. As an example, an actuator (not illustrated) or the like may be used to open and close a hinged lid forming the gate valve 13, a sliding shutter forming the gate valve 13, or the like.

Preferably, an opening formed by the gate valve 13 that is open is smaller than the carbon body 501, in order to prevent the carbon body 501 from falling into the recovery mechanism 15 when the pack material 601 is dumped. Alternatively, the opening formed by the gate valve 13 that is open may have meshes smaller than the carbon body 501, in order to prevent the carbon body 501 from falling into the recovery mechanism 15 when the pack material 601 is dumped. Of course, the size of the opening or the meshes exposed by the gate valve 13 that is open is sufficiently large such that the pack material 601 can be smoothly dumped to the recovery mechanism 15.

The furnace structure 11 forms an enclosed furnace chamber 11A together with the hood 12 in the closed state thereof and the gate valve 13 in the closed state thereof. Prior to the graphitization process, the pack material 601 is supplied to the furnace chamber 11A through the hood 12 in the open state thereof, using a known supply mechanism, in order to fill the furnace chamber 11A up to the first level L1 that buries the support part 111 by the pack material 601. As a result, a bed of the pack material 601 is formed by the pack material 601 that fills the furnace chamber 11A up to the first level L1.

The pack material 601 may be formed by a material such as metallurgical coke (or met coke), for example. The supply mechanism may obtain the pack material 601 from a silo (not illustrated).

Then, the plurality of carbon bodies 501 are loaded into the furnace chamber 11A through the hood 12 in the open state thereof, using a known loading mechanism, so that the plurality of carbon bodies 501 rest at the first level L1 of the pack material 601. In other words, the plurality of carbon bodies 501 are loaded onto the bed of the pack material 601.

In addition, the pack material 601 is again supplied to the furnace chamber 11A through the hood 12 in the open state thereof, using the known supply mechanism, in order to fill the furnace chamber 11A up to a second level L2 that is higher than the first level L1 and buries the carbon bodies 501. As a result, the plurality of carbon bodies 501 are completely covered by the pack material 601 when the pack material 601 fills the furnace chamber 11A up to the second level L2. In the state in which the pack material 601 fills the furnace chamber 11A up to the first level L1 or the second level L2, the pack material 61 is provided between the support part 111 and the carbon bodies 501. Of course, the first level L1 and the second level L2 may be average level's of the pack material 601 within the furnace chamber 11A.

As illustrated in FIG. 2, the graphitization furnace 1 further includes a transformer 17. Of course, each of the control unit 16 and the transformer 17 may be separate from the graphitization furnace 1, and may be externally connected to the graphitization furnace 1.

The furnace structure 11 further includes terminal electrodes 112 configured to electrically connect to opposite ends of the electrically conductive column 501A, as illustrated in FIG. 2. For example, each carbon body 501 may be cylindrical in shape. The terminal electrode 112 at one end of each electrically conductive column 501A is electrically connected to the transformer 17 illustrated in FIG. 2, and the terminal electrode 112 at the other end of each electrically conductive column 501A is electrically grounded. Of course, each electrically conductive column 501A may be formed by one or a plurality of carbon bodies 501.

Although the furnace chamber 11A accommodates two electrically conductive columns 501A in the example illustrated in FIG. 2, the furnace chamber 11A may accommodate one or three or more conductive columns 501A. In a case in which the furnace chamber 11A accommodates a plurality of conductive columns 501A, the plurality of conductive columns 501A may be arranged in parallel.

During the graphitization process that graphitizes the plurality of carbon bodies 501 placed in end-to-end contact to form at least one electrically conductive column 501A within the furnace chamber 11A in the state in which the electrically conductive column 501A at the first level L1 above the support part 11 is buried in the pack material 601 that fills the furnace chamber 11A up to the second level L2, the pair of terminal electrodes 112 electrically connects to the opposite ends of the electrically conductive column 501A.

The support part 111 of the furnace structure 11 is configured to support each electrically conductive column 501A when the pack material 601 is dumped through the gate valve 13 in the open state thereof after the graphitization process and the level of the pack material 601 decreases from the second level L2. More particularly, the support part 111 catches the plurality of carbon bodies 501 as the level of the plurality of carbon bodies 501 lowers with a decrease in an amount of the pack material 601 remaining within the furnace chamber 11A. In order to facilitate smooth downward flow of the pack material 601 when dumping the pack material 601 through the gate valve 13 in the open state thereof, the support part 111 preferably has a mesh structure that permits the pack material 601 to pass through the meshes of the support part 111.

The furnace structure 11 forms the enclosed furnace chamber 11A during the graphitization process which graphitizes the plurality of carbon bodies 501 covered by the pack material 601 into a plurality of graphitized bodies. For example, each graphitized body may be cylindrical in shape. Each graphitized body may form a graphitized electrode body, for example. The support part 111 and the terminal electrodes 112 may be fixed to inner walls of the furnace structure 11 defining the furnace chamber 11A, for example. The inner walls of the furnace structure 11 may be made of a suitable refractory material that provides sufficient heat insulation. The graphitization process in this example is an LWG (Length-Wise Graphitization) process. The pack material 601 within the furnace chamber 11A is dumped through the gate valve 13 in the open state thereof after the graphitization process.

The release valve 14 has an open state and a closed state, and is provided on the furnace structure 1, as illustrated in FIG. 1. The release valve 14 in the open state thereof releases at least one of gas and particulate matter inside the enclosed furnace chamber 11A, after the graphitization process. The release valve 14 may be connected to a fan (not illustrated) or the like, via a pipe 141, for example, in order to release at least one of the gas and the particulate matter outside the graphitization furnace 1 for subsequent filtering or the like.

The recovery mechanism 15 includes a conveyor 151 that recovers the pack material 601 dumped through the gate valve 13 in the open state thereof in order to supply the recovered pack material 601 to a recovery station (not illustrated) via the conveyor 151. The conveyor 151 may be made of stainless steel, for example. The recovery mechanism 15 is preferably enclosed. The recovery station may add fresh pack material 601 to the recovered pack material 601 that is sufficiently cooled, and supply the refreshed pack material 601 to the silo. An enclosed passage 152 may communicate the lower part of the furnace structure 11 at the gate valve 13 to the recovery mechanism 15. At least an inner wall defining the enclosed passage 152 is preferably inclined with respect to a direction in which gravity acts, in order to assist a smooth, controlled downward flow of the pack material 601 when dumping the pack material 601 through the gate valve 13 in the open state thereof. Surfaces of the gate valve 13, the enclosed passage 152, and the conveyor 151 that make contact with the dumped pack material 601 may be made of a suitable material that provides sufficient heat insulation.

The gate valve 13 in the open state thereof preferably dumps the pack material 601 by a weight of the pack material 601. The furnace chamber 11A defined by the inner walls of the furnace structure 11 preferably has a shape constricted towards the lower part of the furnace structure 11, and includes at least an inner wall that is inclined with respect to a direction in which the gravity acts, in order to assist a smooth, controlled downward flow of the pack material 601 when dumping the pack material 601 through the gate valve 13 in the open state thereof.

The control unit 16 controls the open and closed states of the hood 12, the gate valve 13, and the release valve 14. The control unit 16 may be formed by any one of a processor, a general-purpose computer, and dedicated hardware (or circuit), for example.

In a state in which the gate valve 13 and the release valve 14 are in the closed states thereof, the control unit 16 may control the hood 12 to the open state thereof before the graphitization process in order to fill the furnace chamber 11A up to the first level L1 by the pack material 601, load the plurality of carbon bodies 501 into the furnace chamber 11A using the known loading mechanism so that the plurality of carbon bodies 501 rest at the first level L1 of the pack material 601, and further fill the furnace chamber 11A up to the second level L2 so as to cover the plurality of carbon bodies 501 by the pack material 601. The control unit 16 may also control the hood 12 to the open state thereof after the graphitization process when an average temperature of the pack material 601 cools down to a dumpable temperature of approximately 1,300° C. or lower, for example, after the graphitization process.

The dumpable temperature of the pack material 601 may be determined according to refractory properties of the surfaces of the gate valve 13, the enclosed passage 152, the conveyor 151, or the like that make contact with the dumped pack material 601. Hence, the dumping of the pack material 601 starts in a state in which the plurality of graphitized bodies remain within the furnace chamber 11A, together with the pack material 601.

As the pack material 601 is dumped through the gate valve 13 in the open state thereof, the plurality of graphitized bodies gradually move downwards in FIG. 1 with the decrease in the amount of the pack material 601 inside the furnace chamber 11A. The downward movement of the plurality of graphitized bodies is stopped when the position of the support part 111 is reached and the support part 111 catches the plurality of graphitized bodies. As a result, the plurality of graphitized bodies are supported on the support part 111, while the pack material 601 continues to be dumped through the gate valve 13 in the open state thereof.

When the plurality of graphitized bodies are supported on the support part 111 after the graphitization process, the plurality of graphitized bodies are unloaded from the support part 111 within the furnace chamber 11A, through the hood 12 in the open state thereof, using a known unloading mechanism, so that the plurality of graphitized bodies are extracted to the outside of the furnace structure 11. The unloading mechanism may form a loading and unloading mechanism together with the loading mechanism.

Figure 3:
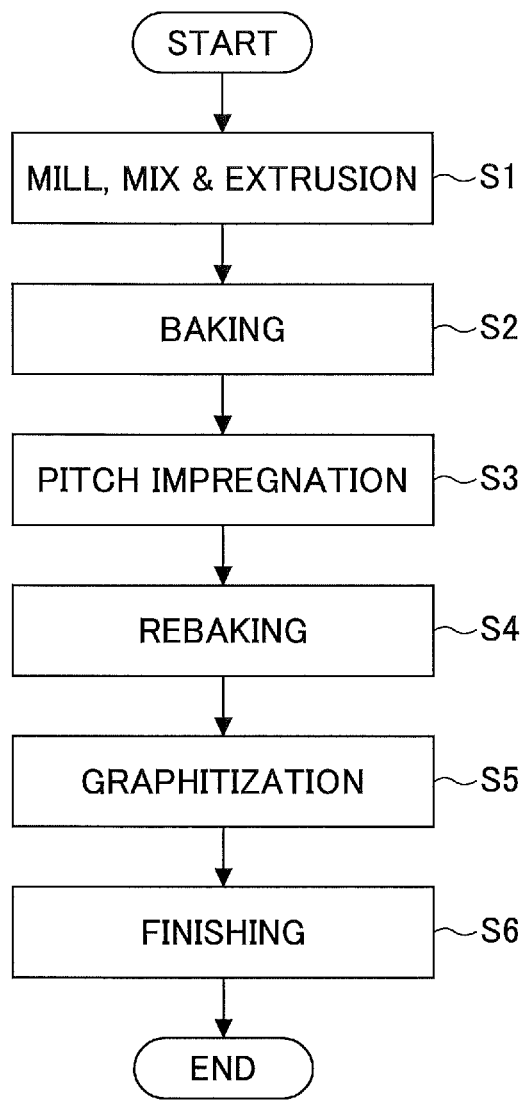
FIG. 3 is a flow chart for explaining an example of a method of manufacturing graphitized bodies using the graphitization furnace illustrated in FIGS. 1 and 2.

Next, a description will be given of an example of the method of manufacturing the graphitized bodies, by referring to FIG. 3. FIG. 3 is a flow chart for explaining the example of the method of manufacturing the graphitized bodies using the graphitization furnace illustrated in FIGS. 1 and 2.

The method illustrated in FIG. 3 includes a mill, mix and extrusion process (step S1), a baking process (step S2), a pitch impregnation process (step S3), a rebaking process (step S4), a graphitization process (step S5), and a finishing process (step S6). Steps S1 through S4 and S6 may be performed by known methods, for example.

In step S1, needle coke and binder pitch, for example, are mixed and extruded into green electrodes. The needle coke may be transferred from the silo (not illustrated), and further sorted by size or crushed to specific-sized particles. The needle coke with various size specifications is mixed to achieve a required particle size distribution. A resultant dry mix is then mixed with the binder pitch to obtain a paste mix. This paste mix is supplied to an extrusion press (not illustrated), in order to form the green electrodes, for example. A known silo and a known extrusion press may be used for the mill, mix and extrusion process of step S1.

In step S2, the green electrodes are loaded into a heating furnace (not illustrated) and heated. In this baking process, the green electrodes are transformed into a hard, rigid structures by carbonization. After reaching a final heating temperature, the heating furnace is cooled and the baked electrodes are unloaded from the heating furnace. A known heating furnace may be used for the baking process of step S2.

In step S3, the baked electrodes are supplied to preheaters (not illustrated) to prepare the baked electrodes for pitch impregnation. The pitch impregnation increases the density of the baked electrodes by exposing the baked electrodes to the pitch under elevated pressure and temperature in an autoclave (not illustrated). A duration of exposure of the baked electrodes under the elevated pressure and temperature varies depending on a diameter of the baked electrodes. After this pitch impregnation, the pitch-impregnated electrodes are cooled. A known preheater, a known autoclave, and a known water spray cooler may be used for the pitch impregnation process of step S3.

In step S4, the pitch-impregnated electrodes are rebaked into rebaked electrodes in a rebaking furnace (not illustrated). A heating cycle of the rebaking process is shorter than that of the baking process of step S2. A known rebaking furnace may be used for the rebaking process of step S4.

In step S5, a crystalline structure of the rebaked electrodes is transformed into graphitic carbon, which results in increased conductivity and machinability of the electrodes. This transformation takes place by intense heating of the rebaked electrodes up to approximately 3,000° C., for example, in the graphitization furnace 1 illustrated in FIGS. 1 and 2, for example.

The carbon bodies 501, corresponding to the rebaked electrodes, are placed in end-to-end contact to form two parallel electrically conductive columns 501A in a state surrounded and supported by the pack material 601 which is also provided between the electrically conductive columns 501A and the support part 111, as illustrated in FIG. 2. In this state, the terminal electrodes 112 electrically connect to the opposite ends of each of the two parallel electrically conductive columns 501A to form a direct current circuit. The two parallel electrically conductive columns 501A and the terminal electrodes 112 are covered by the pack material 601, and power is supplied to the terminal electrodes 112 from the transformer 17 which may include or be connected to a rectifier (not illustrated). As a result, the carbon bodies 501 of the two parallel electrically conductive columns 501A are transformed into the graphitized bodies, that is, graphitized electrodes, by the graphitization process.

After completing the graphitization process or one graphitization cycle, the pack material 601 within the furnace chamber 11A may be dumped by opening the gate valve 13, at a dump timing when the pack material 601 cools down to the dumpable temperature. The pack material 601 may be dumped through the gate valve 13 in the open state thereof when the average temperature of the pack material 601 is cooled to the dumpable temperature of approximately 900° C. to approximately 1,300° C., for example. The dumpable temperature of the pack material 601 may preferably be approximately 1,000° C. to approximately 1,200° C., and more preferably be approximately 1,000° C. to approximately 1,100° C., for example. A lower limit of the dumpable temperature range is preferably approximately 1,000° C. from the viewpoint of effectively reducing the cooling time. An upper limit of the dumpable temperature range is preferably approximately 1,200° C. from the viewpoint of minimizing damage to the graphitization furnace 1. The lower and upper limits of the dumpable temperature range are preferably approximately 1,000° C. and approximately 1,100° C., respectively, from the viewpoint of facilitating long-term maintenance of the graphitization furnace 1.

The dump timing, that is, a length of time from completing the graphitization process, may be determined from experimentation, for example. In order to gradually dump the pack material 601, the gate valve 13 may be opened intermittently, that is, the gate valve 13 may alternately repeat the open state and the closed state, starting from the dump timing.

The graphitization furnace 1 is self-cooled for a cooling time after completing the graphitization process, even while the pack material 601 is being dumped, until the temperature inside the furnace chamber 11A reaches an unloading temperature suited for unloading the graphitized bodies, that is, the graphitized electrodes, from the furnace structure 11 through the hood 12 in the open state thereof. The graphitized electrodes may be suited for unloading from the furnace structure 11 when the temperature thereof reaches the unloading temperature of approximately 800° C. to approximately 900° C., for example. A length of the cooling time may be determined from experimentation, for example.

Because the pack material 601 can be dumped through the gate valve 13 in the open state thereof at the dump timing when the pack material 601 cools down to the dumpable temperature, the temperature inside the furnace chamber 11A can be lowered more quickly compared to the conventional apparatus in which the pack material is self-cooled to a certain temperature before being collected under suction by a collecting mechanism from the furnace chamber through the open hood, and the graphitized electrodes are thereafter unloaded from the furnace chamber through the open hood after the temperature thereof is sufficiently lowered to the unloading temperature. In addition, the temperature inside the furnace chamber 11A can also be lowered more quickly compared to the proposed apparatus proposed in U.S. Pat. No. 4,394,766, for example, which removes the electrodes from the furnace by the stock extractor after the predetermined cooling period, and the thermal insulation medium is thereafter dumped into the hoppers.

As an example, according to experiments conducted by the present inventors, it was confirmed that the self-cooling time after completing the graphitization process until the unloading temperature is reached inside the furnace chamber 11A in this embodiment can be reduced to 60% to 70% of the self-cooling times required by the conventional apparatus and the proposed apparatus described above.

Hence, step S5 that uses the graphitization furnace 1 in this embodiment can manufacture the graphitized bodies, such as the graphitized electrodes, with a high efficiency.

In addition, after completing the graphitization process, the release valve 14 may be opened at the dump timing in order to release at least one of gas and particulate matter inside the furnace chamber 11A as the pack material 601 is dumped. For this reason, at least one of the gas and the particulate matter inside the furnace chamber 11A can be released through the pipe 141 after the graphitization process, before the hood 12 is opened. The release valve 14 may be opened intermittently, that is, the release valve 14 may alternately repeat the open state and the closed state, starting from the dump timing. By the time the hood 12 is opened after the graphitization process and the lapse of the cooling time, a substantial amount of at least one of the gas and the particulate matter is already released through the open release valve 14 and the pipe 141. Furthermore, by maintaining the release valve 14 open or intermittently open after the hood 12 is opened, at least one of the gas and the particulate matter inside the furnace chamber 11A can be released through the open release valve 14 and the pipe 141, even after the hood 12 is opened. As a result, emissions, such as $SO_x$ (for example, $SO_2$) emissions and PM (Particulate Matter) emissions, for example, can be reduced, not only during the cooling time in which the hood 12 is closed, but also after the cooling time when the hood 12 is open.

In a case in which the recovery mechanism 15 is enclosed together with the enclosed passage 152, another release valve (not illustrated) may be provided in at least one of the recovery mechanism 15 at a position P1 in FIG. 1, for example, and the enclosed passage 152 at a position P2 in FIG. 1, for example, in order to release at least one of the gas and the particulate matter outside the graphitization furnace 1 through this other release valve for subsequent filtering or the like. For example, the release valve 14 may be opened or intermittently opened in order to release at least one of the gas and the particulate matter in the state in which the hood 12 is closed, and this other release valve may be opened or intermittently opened as the pack material 601 is dumped in order to release the remaining gas and/or particulate matter.

According to experiments conducted by the present inventors, in the conventional apparatus and the proposed apparatus described above in which the pack material does not move during the self-cooling time, and the graphitized electrodes are unloaded from the furnace chamber through the open hood after the self-cooling time elapses, the gas and/or particulate matter generated within the furnace chamber is released outside the furnace chamber within a factory building when the hood is opened. This is because the pack material is agitated by the collecting mechanism when unloading the graphitized electrodes. For this reason, even when a scrubber or the like is used to collect the gas and/or particulate matter when the hood is opened, only a small portion of the gas and/or particulate matter generated within the furnace chamber can be collected.

On the other hand, according to experiments conducted by the present inventors for this embodiment, it was confirmed that the gas and/or particulate matter are positively collectable through the release valve 14, or by a combination of the release valve 14 and a scrubber (not illustrated), and a large portion of the gas and/or particulate matter generated within the furnace chamber 11A can be collected when compared to the conventional apparatus and the proposed apparatus described above. Further, it was confirmed that an amount of gas and/or particulate matter released outside the furnace chamber 11A within the factory building when the hood 12 is opened, can be negligibly small by maintaining the release valve 14 open or intermittently open after the hood 12 is opened, because most of the pack material 601 is dumped by the time the hood 12 is opened and the pack material 601 is not agitated when unloading the graphitized electrodes.

An efficiency of cleaning the inside of the furnace chamber 11A by the scrubber (not illustrated) after dumping the pack material 601 and unloading the graphitized electrodes, prior to the next graphitization process on the next set of carbon bodies 501, can be improved since it is possible to efficiently release the particulate matter outside the graphitization furnace 1.

In step S6 illustrated in FIG. 3, the graphitized electrodes are machined according to requirements or specifications. For example, the finishing process of step S6 may include machining an outer diameter and end faces of the graphitized electrodes by a cutting apparatus (not illustrated), machining a bore socket in each end face of the graphitized electrodes by the cutting apparatus, and machining a thread in the socket bore by the cutting apparatus.

The graphitized electrodes after being subjected to the finishing process may be inspected before being forwarded as a graphite electrode product.

As is well known, shower heads (not illustrated) may be provided on the inner wall of the furnace structure 11 at a position P3 in FIG. 1, for example. In this case, a suitable amount of water may be sprayed on the pack material 601 before opening the gate valve 13, in order to positively evaporate the water before the water reaches the graphitized bodies. The forced cooling using the water may shorten the cooling time. However, the amount of water to be sprayed and the timing at which the water is sprayed are preferably controlled in order to minimize damage to the furnace chamber 11A caused by generation of $H_2S$ gas and to prevent damage to the graphitized bodies caused by rapid cooling.

Figure 4:
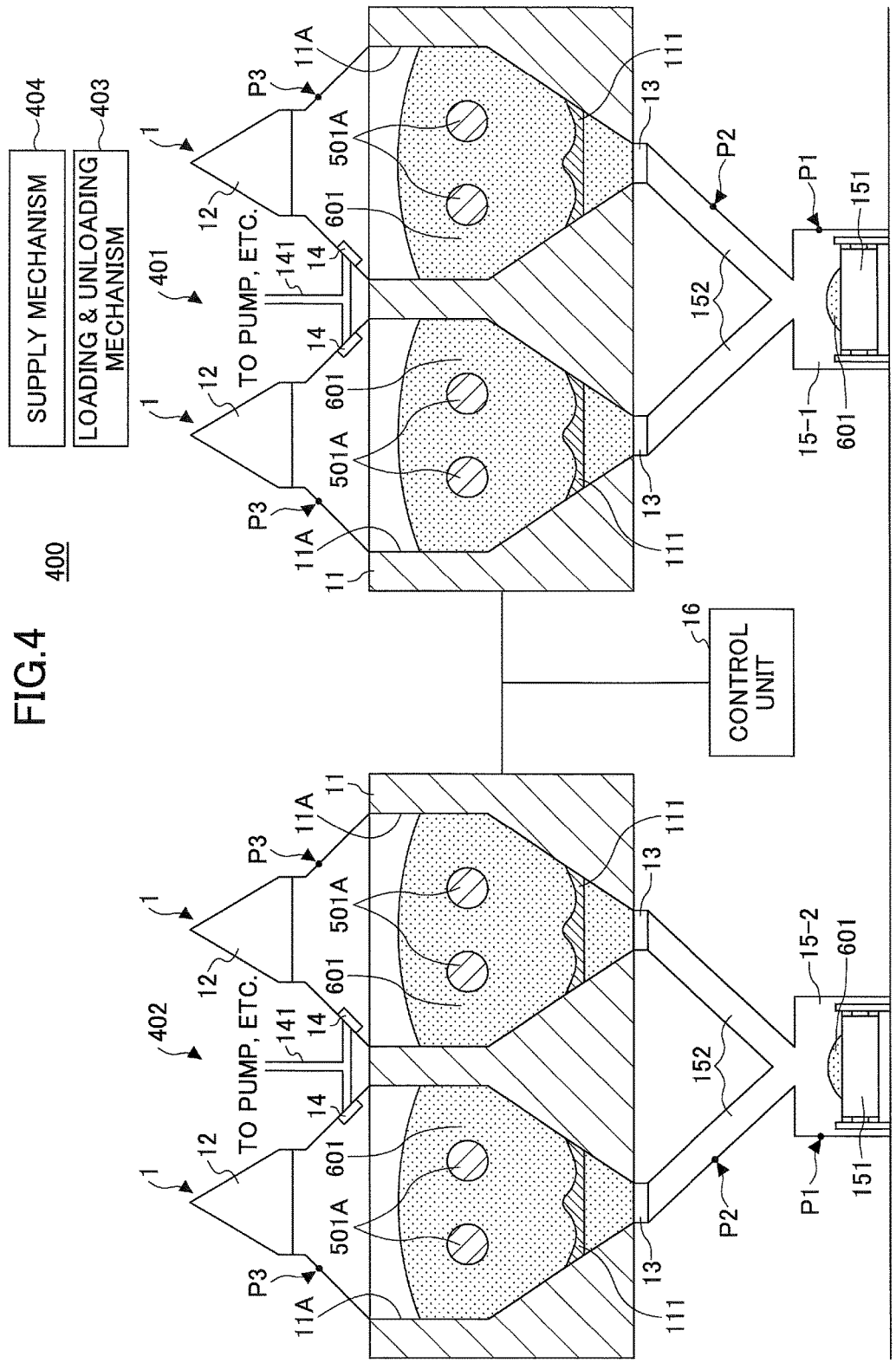
FIG. 4 is a diagram schematically illustrating an example of a system including a plurality of graphitization furnaces.

FIG. 4 is a diagram schematically illustrating an example of a system including a plurality of graphitization furnaces.

In FIG. 4, those parts that are the same as those corresponding parts in FIGS. 1 and 2 are designated by the same reference numerals, and a description thereof will be omitted. In FIG. 4, the illustration of the first level L1 and the second level L2 of the pack material 601 within the furnace chamber 11A of each graphitization furnace 1 is omitted for the sake of convenience.

In the example illustrated in FIG. 4, a system 400 includes a plurality of graphitization furnaces 1. In this example, the graphitization furnaces 1 are arranged in four rows, where each row of graphitization furnaces includes a plurality of graphitization furnaces 1. In addition, two right rows are paired to form a right furnace assembly 401, and two left rows are paired to form a left furnace assembly 402. The right furnace assembly 401 shares a recovery mechanism 15-1, and the left furnace assembly 402 shares a recovery mechanism 15-2. For example, in a case in which each row of graphitization furnaces includes ten graphitization furnaces 1, ten right furnace assemblies 401 and ten left furnace assemblies are provided.

A loading and unloading mechanism 403 (only one illustrated for the sake of convenience), and a supply mechanism (or loading hopper, only one illustrated for the sake of convenience) 404 are respectively provided to each of the right and left furnace assemblies 401 and 402.

The loading and unloading mechanism 403 is configured to load the plurality of carbon bodies 501 into the furnace chamber 11A of each of the plurality of graphitization furnaces 1 having the hood 12 in the open state thereof before the graphitization process of each of the plurality of graphitization furnaces 1, and to unload the plurality of graphitized bodies from the furnace chamber 11A of each of the plurality of graphitization furnaces 1 having the hood 12 in the open state thereof after the graphitization process and the unloading temperature is reached in each of the plurality of graphitization furnaces 1. A known loading and unloading mechanism may be used for the loading and unloading mechanism 403.

The supply mechanism 404 obtains the pack material 601 from the silo, and supplies the pack material 601 to the furnace chamber 11A of each of the plurality of graphitization furnaces 1 having the hood 12 in the open state thereof before the graphitization process of each of the plurality of graphitization furnaces 1. A known supply mechanism may be used for the supply mechanism 404.

A control unit 160, similar to the control unit 16 illustrated in FIG. 1, may control the operations of the loading and unloading mechanism 403 and the supply mechanism 404. For example, the control unit 160 may control the loading and unloading mechanism 403 to load the plurality of carbon bodies 501 into the furnace chamber 11A of one of the plurality of graphitization furnaces 1 in the right furnace assembly 401 (or left furnace assembly 402), and to unload the plurality of graphitized bodies from the furnace chamber 11A of the one of the plurality of graphitization furnaces 1 in the right furnace assembly 401 (or left furnace assembly 402).

The control unit 160 may control the operations of the loading and unloading mechanism 403 and the supply mechanism 404, in synchronism with operations to control sequential opening and closing of the hoods 12 of the plurality of graphitization furnaces 1 and sequential opening and closing of the gate valves 13 of the plurality of graphitization furnaces 1.

The right and left furnace assemblies 401 and 402 may be joined to form a single, substantially U-shaped assembly, or to form a single, substantially circular or oval or rectangular assembly when viewed in a plan view. In this case, the recovery mechanisms 15-1 and 15-2 may also be joined to form a single, substantially U-shaped recovery mechanism, or to form a single, substantially circular or oval or rectangular recovery mechanism when viewed in a plan view. The single recovery mechanism in this case may communicate with the recovery station at a predetermined position thereof. In the case in which the right and left furnace assemblies 401 and 402 are joined to form the single assembly, a single loading and unloading mechanism may be used in common for the entire single assembly, and a single supply mechanism may similarly be used in common for the entire single assembly.

A scrubber (not illustrated) or the like that may be used for collecting the gas and/or particulate matter or for cleaning when the hood 12 is opened, may be provided separately from the loading and unloading mechanism 403.

Although FIG. 4 illustrates a case in which the two right rows paired to form the right furnace assembly 401 have the release valves 14 thereof connected to a first common pipe 141, and the two left rows paired to form the left furnace assembly 402 have the release valves 14 thereof connected to a second common pipe 141, the release valves 14 in different rows of graphitization furnaces 1 may be connected to separate pipes 141, for example.

Figure 5:
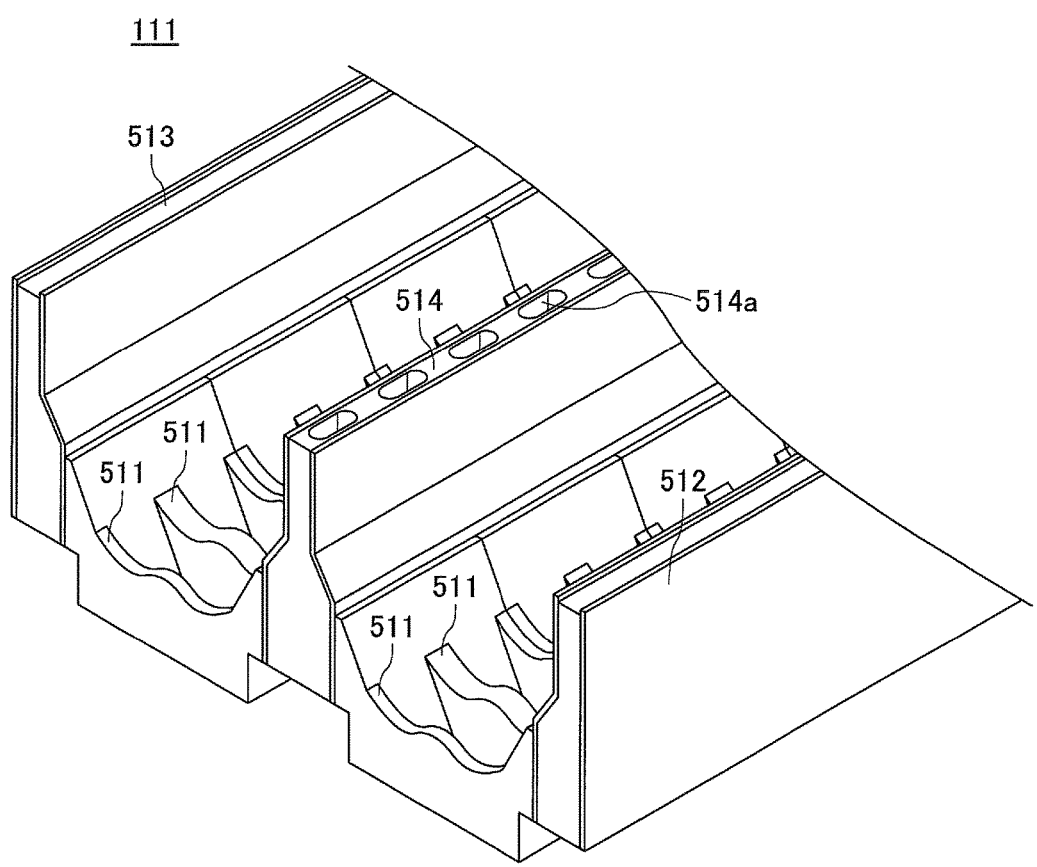
FIG. 5 is a perspective view schematically illustrating an example of a support part.

FIG. 5 is a perspective view schematically illustrating an example of the support part. FIG. 5 illustrates, in part, the example of the support part 111 provided in the furnace chamber 11A of the furnace structure 11 of the graphitization furnace 1.

The support part 111 includes a plurality of support ribs 511 that support the electrically conductive column 501A (not illustrated) at suitable intervals. In this example, each of the support ribs 511 has a top end having a curved shape in accordance with the cylindrical shape of the carbon bodies 501. Contact areas between the support ribs 511 and the carbon bodies 501 are preferably small. In this example, one or more carbon bodies 501 are supported on each of the right and left sides of the support part 111. Further, in order to facilitate smooth downward flow of the pack material 601 (not illustrated) when dumping the pack material 601 through the gate valve 13 in the open state thereof, the support ribs 511 are arranged at intervals to form a kind of a mesh structure that permits the pack material 601 to pass through the meshes of the support part 111. Hence, in the state in which the pack material 601 is filled up to at least the first level within the furnace chamber 11A, spaces between two adjacent support ribs 511 are filled by the pack material 601.

The support part 111 includes a right wall 512, a left wall 513, and a center wall 514 which may form fins to facilitate cooling of the support part 111 after the graphitization process. For example, at least the center wall 514 may be hollow and contain flues 514a for cooling the center wall 514. The walls 512, 513, and 514 of the support part 111 may be omitted, and FIGS. 1 and 4 illustrate the support part 111 with the walls 512, 513, and 514 omitted.

According to the embodiments described above, it is possible to provide a graphitization furnace and a system that enable design of a high-productivity system.

What is claimed is:
1. A graphitization furnace comprising:
 a furnace chamber defined by walls that are made of a refractory material, wherein the furnace chamber has an upper part, a lower part, an opening provided at the upper part, and a shape that is constricted towards the lower part, and at least one of the walls is inclined with respect to a direction in which gravity acts;

a hood, provided at the upper part of the furnace chamber, and having an open state to open the opening of the furnace chamber and a closed state to close the opening of the furnace chamber;

a gate valve, provided at the lower part of the furnace chamber, and having an open state and a closed state, wherein the furnace chamber is enclosed by a combination of the walls, the hood, and the gate valve in a state in which the hood is in the closed state and the gate valve is in the closed state;

a support part, other than the walls of the furnace chamber, extending laterally inside the furnace chamber; and a pair of terminal electrodes, provided inside the furnace chamber, and configured to electrically connect to opposite ends of an electrically conductive column during an LWG (Length-Wise Graphitization) process which graphitizes the electrically conductive column buried in a pack material accommodated within the furnace chamber at a level above the support part in the closed state of the gate valve, wherein the walls make direct contact with the pack material accommodated within the furnace chamber, wherein the electrically conductive column includes a plurality of carbon bodies placed in end-to-end contact, that are graphitized into a plurality of graphitized bodies by the LWG process, wherein the gate valve in the open state after the LWG process dumps the pack material accommodated within the furnace chamber in a state in which the plurality of graphitized bodies are located within the furnace chamber, and wherein the support part includes at least one opening gap formed therein to support the plurality of graphitized bodies while simultaneously permitting dumping of the pack material through the at least one opening gap as the level of the plurality of graphitized bodies lowers with a decrease in an amount of the pack material remaining within the furnace chamber.

2. The graphitization furnace as claimed in claim 1, further comprising:

a release valve, connected to the furnace chamber, and having an open state and a closed state, wherein the release valve in the open state releases at least one of gas and particulate matter inside the furnace chamber.

3. The graphitization furnace as claimed in claim 1, further comprising:

a recovery mechanism, including a conveyor, configured to recover the pack material dumped through the gate valve in the open state.

4. The graphitization furnace as claimed in claim 1, further comprising:

a control unit configured to control the open and closed states of the hood and the gate valve.

5. The graphitization furnace as claimed in claim 4, wherein the control unit controls the hood to the open state and the gate valve to the closed state before the LWG process to perform a process including supplying the pack material to the furnace chamber through the opening up to a first level that buries the support part by the pack material to form a bed of the pack material, loading the plurality of carbon bodies into the furnace chamber through the opening onto the bed of the pack material, and supplying the pack material again to the furnace chamber through the opening to a second level, higher than the first level, that buries the plurality of carbon bodies in the pack material, and wherein the control unit controls the gate valve to the open state after the LWG process when a temperature of the pack material cools down to a dumpable temperature.

6. The graphitization furnace as claimed in claim 2, further comprising:

a control unit configured to control the open and closed states of each of the gate valve, the hood, and the release valve, wherein the control unit controls the gate valve to open or intermittently open after the LWG process in a state in which the hood is closed at a dump timing when a temperature of the pack material cools down to a dumpable temperature, wherein the control unit controls the release valve to open or intermittently open from the dump timing, and wherein the control unit controls the hood to open after the LWG process when a cooling time, sufficient to cool the plurality of graphitized bodies to an unloading temperature suited for unloading the plurality of graphitized bodies from the furnace chamber, elapses.

7. A system comprising:

a plurality of graphitization furnaces each including a furnace chamber defined by walls that are made of a refractory material, wherein the furnace chamber has an upper part, a lower part, an opening provided at the upper part, and a shape that is constricted towards the lower part, and at least one of the walls is inclined with respect to a direction in which gravity acts;

a hood, provided at the upper part of the furnace chamber, and having an open state to open the opening of the furnace chamber and a closed state to close the opening of the furnace chamber;

a gate valve, provided at the lower part of the furnace chamber, and having an open state and a closed state, wherein the furnace chamber is enclosed by a combination of the walls of the furnace chamber, the hood, and the gate valve in a state in which the hood is in the closed state and the gate valve is in the closed state;

a support part, other than the walls of the furnace chamber, extending laterally inside the furnace chamber; and a pair of terminal electrodes, provided inside the furnace chamber, and configured to electrically connect to opposite ends of an electrically conductive column during an LWG (Length-Wise Graphitization) process which graphitizes the electrically conductive column, buried in a pack material accommodated within the furnace chamber, at a level above the support part in the closed state of the gate valve, wherein the walls make direct contact with the pack material accommodated within the furnace chamber, wherein the electrically conductive column includes a plurality of carbon bodies placed in end-to-end contact, that are graphitized into a plurality of graphitized bodies by the LWG process, wherein the gate valve in the open state after the LWG process dumps the pack material accommodated within the furnace chamber in a state in which the plurality of graphitized bodies are located within the furnace chamber, and wherein the support part includes at least one opening gap formed therein to support the plurality of graphitized bodies while simultaneously permitting dumping of the pack material through the at least one opening gap as the level of the plurality of graphitized bodies lowers with a decrease in an amount of the pack material remaining within the furnace chamber.

8. The system as claimed in claim 7, wherein each of the plurality of graphitization furnaces further includes
a release valve, connected to the furnace chamber, and having an open state and a closed state,
wherein the release valve in the open state releases at least one of gas and particulate matter inside the furnace chamber.

9. The system as claimed in claim 7, further comprising:
a recovery mechanism, including a conveyor, configured to recover the pack material dumped from at least one of the plurality of graphitization furnaces through the gate valve in the open state to supply the recovered pack material to a recovery station via the conveyor.

10. The system as claimed in claim 7, further comprising:
a control unit configured to control the open and closed states of the hood and the gate valve of each of the plurality of graphitization furnaces.

11. The system as claimed in claim 10,
wherein the control unit controls the hood of each of the plurality of graphitization furnaces to the open state and the gate valve of each of the plurality of graphitization furnaces to the closed state before the LWG process to perform a process including
supplying the pack material to the furnace chamber through the opening up to a first level that buries the support part by the pack material to form a bed of the pack material,
loading the plurality of carbon bodies into the furnace chamber through the opening onto the bed of the pack material, and
supplying the pack material again to the furnace chamber through the opening to a second level, higher than the first level, that buries the plurality of carbon bodies in the pack material, and
wherein the control unit controls the gate valve to the open state after the LWG process when a temperature of the pack material cools down to a dumpable temperature.

12. The system as claimed in claim 8, further comprising:
a control unit configured to control the open and closed states of the gate valve, the hood, and the release valve of each of the plurality of graphitization furnaces,
wherein the control unit controls the gate valve to open or intermittently open after the LWG process in a state in which the hood is closed at a dump timing when a temperature of the pack material cools down to a dumpable temperature,
wherein the control unit controls the release valve to open or intermittently open from the dump timing, and
wherein the control unit controls the hood to open after the LWG process when a cooling time, sufficient to cool the plurality of graphitized bodies to an unloading temperature suited for unloading the plurality of graphitized bodies from the furnace chamber, elapses.

13. A graphitization method comprising:
performing an LWG (Length-Wise Graphitization) process in a graphitization furnace which graphitizes an electrically conductive column, buried in a pack material accommodated within a furnace chamber, at a level above a support part that extends laterally inside the furnace chamber, and having opposite ends electrically connected to a pair of terminal electrodes provided inside the furnace chamber, wherein the electrically conductive column includes a plurality of carbon bodies that are placed in end-to-end contact and are graphitized into a plurality of graphitized bodies by the LWG process, and wherein the furnace chamber is enclosed by a combination of walls that are made of a refractory material and define an opening of the furnace chamber at an upper part of the furnace chamber, a hood that is provided at the upper part of the furnace chamber, and a gate valve that is provided at a lower part of the furnace chamber, in a state in which the hood is in a closed state to close the opening and the gate valve is in a closed state, wherein the support part is other than the walls of the furnace chamber, and the walls make direct contact with the pack material accommodated within the furnace chamber; and
dumping the pack material accommodated within the furnace chamber by opening the gate valve after the LWG process in a state in which the plurality of graphitized bodies are located within the furnace chamber and the support part includes at least one opening gap formed therein to support the plurality of graphitized bodies while simultaneously permitting dumping of the pack material through the at least one opening gap as the level of the plurality of graphitized bodies lowers with a decrease in an amount of the pack material remaining within the furnace chamber.

14. The graphitization method as claimed in claim 13, further comprising:
opening a release valve of the graphitization furnace at a dump timing when an average temperature of the pack material cools down to a dumpable temperature to release at least one of gas and particulate matter inside the furnace chamber.

15. The graphitization method as claimed in claim 14, wherein the dumpable temperature is 900° C. to 1,300° C.

16. The graphitization method as claimed in claim 14, further comprising:
opening the hood of the graphitization furnace after the LWG process when a cooling time, sufficient to cool the plurality of graphitized bodies to an unloading temperature suited for unloading the plurality of graphitized bodies from the furnace chamber, elapses.

17. A graphitization furnace configured to perform an LWG (Length-Wise Graphitization) process, comprising:
a chamber defined by walls that are made of a refractory material and define an opening of a chamber, wherein the chamber has an upper part, a lower part, an opening provided at the upper part, and a shape that is constricted towards the lower part, the walls make direct contact with a pack material that is accommodated within the chamber during the LWG process, and at least one of the walls is inclined with respect to a direction in which gravity acts;
a hood, provided at the upper part of the chamber, and having an open state to open the opening of the chamber and a closed state to close the opening of the chamber;
a gate valve, provided at the lower part of the chamber, and having an open state and a closed state,
wherein the chamber is enclosed by a combination of the walls, the hood, and the gate valve in a state in which the hood is in the closed state and the gate valve is in the closed state;

a support part, other than the walls of the chamber and provided inside the chamber, traversing a space between the walls of the chamber; and a pair of terminal electrodes, provided inside the chamber, and configured to electrically connect to opposite ends of an electrically conductive column during the LWG process which graphitizes the electrically conductive column buried in the pack material accommodated within the chamber, wherein the electrically conductive column includes a plurality of carbon bodies placed in end-to-end contact, that are graphitized into a plurality of graphitized bodies by the LWG process, wherein the gate valve in the open state after the LWG process dumps the pack material accommodated within the chamber in a state in which the plurality of graphitized bodies are located within the chamber, and wherein the support part includes at least one opening gap formed therein to support the plurality of graphitized bodies while simultaneously permitting dumping of the pack material through the at least one opening gap as the level of the plurality of graphitized bodies lowers with a decrease in an amount of the pack material remaining within the chamber.

18. The graphitization furnace as claimed in claim 17, wherein the support part supports at least one graphitized body that has been graphitized by the LWG process and is buried in the pack material accommodated within the chamber after the LWG process when the pack material accommodated within the chamber is dumped through the gate valve in the open state, and wherein the support part includes meshes configured to support the at least one graphitized body while simultaneously permitting dumping of the pack material through the meshes.

19. The graphitization furnace as claimed in claim 17, wherein the support part is fixed to the walls of the chamber.

20. A system comprising:

a plurality of graphitization furnaces configured to perform an LWG (Length-Wise Graphitization) process; and a processor configured to control the plurality of graphitization furnaces, wherein each of the plurality of graphitization furnaces comprises a chamber defined by walls that are made of a refractory material, wherein the chamber has an upper part, a lower part, an opening provided at the upper part, and a shape that is constricted towards the lower part, the walls make direct contact with a pack material that is accommodated within the chamber during the LWG process, and at least one of the walls is inclined with respect to a direction in which gravity acts;

a hood, provided at the upper part of the chamber, and having an open state to open the opening of the chamber and a closed state to close the opening of the chamber;

a gate valve, provided at the lower part of the chamber, and having an open state and a closed state, wherein the chamber is enclosed by a combination of the walls, the hood, and the gate valve in a state in which the hood is in the closed state and the gate valve is in the closed state;

a support part, other than the walls of the chamber and provided inside the chamber, traversing a space between the walls of the chamber; and a pair of terminal electrodes, provided inside the chamber, and configured to electrically connect to opposite ends of an electrically conductive column during the LWG process which graphitizes the electrically conductive column buried in the pack material accommodated within the chamber, wherein the electrically conductive column includes a plurality of carbon bodies placed in end-to-end contact, that are graphitized into a plurality of graphitized bodies by the LWG process, wherein the gate valve in the open state after the LWG process dumps the pack material accommodated within the chamber in a state in which the plurality of graphitized bodies are located within the chamber, and wherein the support part includes at least one opening gap formed therein to support the plurality of graphitized bodies while simultaneously permitting dumping of the pack material through the at least one opening gap as the level of the plurality of graphitized bodies lowers with a decrease in an amount of the pack material remaining within the chamber.

21. The graphitization furnace as claimed in claim 17, wherein the support part includes ribs, that are other than the walls of the chamber, and wherein the ribs are fixed to the walls to traverse the space between the walls.

22. The system as claimed in claim 20, wherein the support part includes ribs, that are other than the walls of the chamber, and wherein the ribs are fixed to the walls to traverse the space between the walls.

* * * * *